US007562213B1

(12) United States Patent
Timms

(10) Patent No.: US 7,562,213 B1
(45) Date of Patent: Jul. 14, 2009

(54) APPROACHES FOR APPLYING SERVICE POLICIES TO ENCRYPTED PACKETS

(75) Inventor: Natalie Timms, Seattle, WA (US)

(73) Assignee: Cisco Technology, Inc., San Jose, CA (US)

(*) Notice: Subject to any disclaimer, the term of this patent is extended or adjusted under 35 U.S.C. 154(b) by 791 days.

(21) Appl. No.: 10/664,267

(22) Filed: Sep. 16, 2003

(51) Int. Cl.
*H04L 9/00* (2006.01)
(52) U.S. Cl. ...................................... 713/160
(58) Field of Classification Search ................... 713/160
See application file for complete search history.

(56) References Cited

U.S. PATENT DOCUMENTS

| | | | | |
|---|---|---|---|---|
| 6,721,202 | B1 * | 4/2004 | Roge et al. .................. | 365/168 |
| 6,804,257 | B1 * | 10/2004 | Benayoun et al. ........... | 370/471 |
| 2002/0062344 | A1 * | 5/2002 | Ylonen et al. ............... | 709/204 |
| 2002/0078341 | A1 * | 6/2002 | Genty et al. ................ | 713/151 |
| 2003/0005279 | A1 * | 1/2003 | Valenci et al. .............. | 713/150 |
| 2003/0126468 | A1 * | 7/2003 | Markham .................... | 713/201 |
| 2004/0005061 | A1 * | 1/2004 | Buer et al. .................. | 380/282 |
| 2005/0088977 | A1 * | 4/2005 | Roch et al. .................. | 370/254 |

OTHER PUBLICATIONS

D. Piper, "The Internet IP Security Domain of Intepretatio for ISAKMP," Nov. 1998, Network Working Group. www.ietf.org/rfc/rfc2407.txt, data retrieved Jan. 5, 2007, pp. 1-30.*

Cisco Systems, Inc., "Quality of Service for Virtual Private Networks," 1999, pp. 1-9.
Roger W. Younglove, "IPSec (IP Security), What Makes it Work," http://www.issa.org/motor_city/IPSec%20How%20it%20works.IEE.htm, data retrieved Feb. 27, 2003, pp. 1-5.
Author unknown, "Plan for the Day," pp. 1-6.
Eddie Younker, "IP Security Protocol-based VPNs," Oct. 9, 2001, http://www.sans.org/rr/protocols/IPsec.php, data retrieved Feb. 27, 2003, pp. 1-5.
Author unknown, "CSCI 7000-001—Network-level Security: IPSec Basic Architecture, AH, and ESP," Oct. 23, 2002, pp. 1-9.
S. Kent, et al., "Security Architecture for the Internet Protocol," Nov. 1998, Network Working Group, Request for Comments: 2401, http://rfc.net/rfc2401.html, data retrieved Mar. 18, 2003, pp. 1-66.
D. Maughan, et al., "Internet Security Association and Key Management Protocol (ISAKMP)," Nov. 1998, Network Working Group, Request for Comments: 2408, http://www.faqs.org/rfcs/rfc2408.html, data retrieved Apr. 22, 2003, pp. 1-66.

(Continued)

*Primary Examiner*—Kambiz Zand
*Assistant Examiner*—Jason K Gee
(74) *Attorney, Agent, or Firm*—Hickman Palermo Truong & Becker, LLP

(57) ABSTRACT

Approaches for applying service polices to encrypted packets are disclosed. One approach comprises examining an encrypted packet, determining whether an identifier associated with a service is present in an encrypted packet, and if it is determined that the identifier is present in the encrypted packet, applying the service to the encrypted packet. In an embodiment, the identifier is the Internet Key Exchange (IKE) ID of the encrypted packet.

39 Claims, 4 Drawing Sheets

OTHER PUBLICATIONS

Altera Corporation, "MPLS Network Diagram," http://www.altera.com/solutions/comm/networking/mpls/net-mpls_network.html, data retrieved Apr. 22, 2003, pp. 1-2.

D. Piper, "The Internet IP Security Domain of Interpretation for ISAKMP," Nov. 1998, Network Working Group, Request for Comments: 2407, http://www.faqs.org/rfcs/rfc2407.html, data retrieved Apr. 22, 2003, pp. 1-26.

W3C, "XML in 10 Points," http://www.w3.org/XML/1999/XML-in-10-points, data retrieved Apr. 23, 2003, pp. 1-5.

* cited by examiner

APPROACHES FOR APPLYING SERVICE POLICIES TO ENCRYPTED PACKETS

FIELD OF THE INVENTION

The present invention generally relates to communication networks. The invention relates more specifically to approaches for applying service policies to encrypted packets.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

When data packets are transmitted across communication networks, various service policies, including quality of service (QoS) policies, may be applied to the data packets. These service policies allow a service provider to manage the data packets that are transmitted over the communication network. For example, service policies may include measures for reducing congestion at various points in the network, or may include measures that guarantee specified bandwidth requirements for certain users or network elements.

With greater frequency, various forms of security measures, such as IPsec or other measures that include encryption, are used in networks to maintain confidentiality of data packets. The application of security measures, by service providers in particular, has led to new challenges in the application of service policies. Specifically, it is very difficult to apply service policies, such as QoS, to data that is protected by IPsec or other security measures.

Generally, the difficulty arises because, after encryption, the actual content of a packet is unintelligible to the network components that traditionally apply service policies. Because the encrypted packet data is unintelligible, the network components are unable to examine packet data to determine whether a service should be applied to the packet.

In general, service policies are applied to packets when a packet is processed at an interface. For example, queuing classification may be applied on an outbound interface. Security measures, sometimes called security services, such as IPsec are generally applied before many QoS mechanisms are applied. Thus, after IPsec is applied to a packet, the packet becomes unintelligible and a router or switch cannot determine whether to apply QoS policy to the packet.

In certain prior approaches, there are two ways to apply service policies, such as QoS, to packets that are encrypted or are to be encrypted. The first option is to use some type of proprietary pre-classification. In this option, packets that require the application of service policies are identified prior to the application of encryption and are segregated so that the service policy can be applied prior to, during or after encryption. In the second option, service policies can be applied based on Type of Service ("ToS") bits that may be copied to the IPsec headers during the IPsec processing. In effect, the ToS bits "mark" the encrypted packets that are subject to services.

However, pre-classification measures and the copying of ToS bits are often costly in terms of computational and memory resources. Therefore, it would be desirable to have a method of applying service policies, such as QoS, to encrypted packets in a manner that avoids, or reduces the reliance on, pre-classification or copying ToS bits.

In addition, additional complications arise when service providers with to apply service policies with IPsec in the context of Virtual Private Networks (VPN). In a VPN, data packets originate from a device, and travel across the Internet to the service provider via an IPsec tunnel that is terminated by the service provider. The data packets are then forwarded across a Multi-protocol Label Switching ("MPLS") network towards the actual destination, which may be an enterprise network. Several customers of a service provider may have overlapping IP addresses. The addresses may be assigned from a pool of IP addresses, and may be, in effect, virtual IP addresses. Therefore, based on the IP address, service mechanisms such as QoS are unable to identify particular customers or users. As a result, in a VPN, customer or user-specific service policies cannot be applied based on an IP address.

Thus, it would be desirable to a have a mechanism to apply service policies to encrypted or unintelligible packets in networks that have users or customers with overlapping IP addresses.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
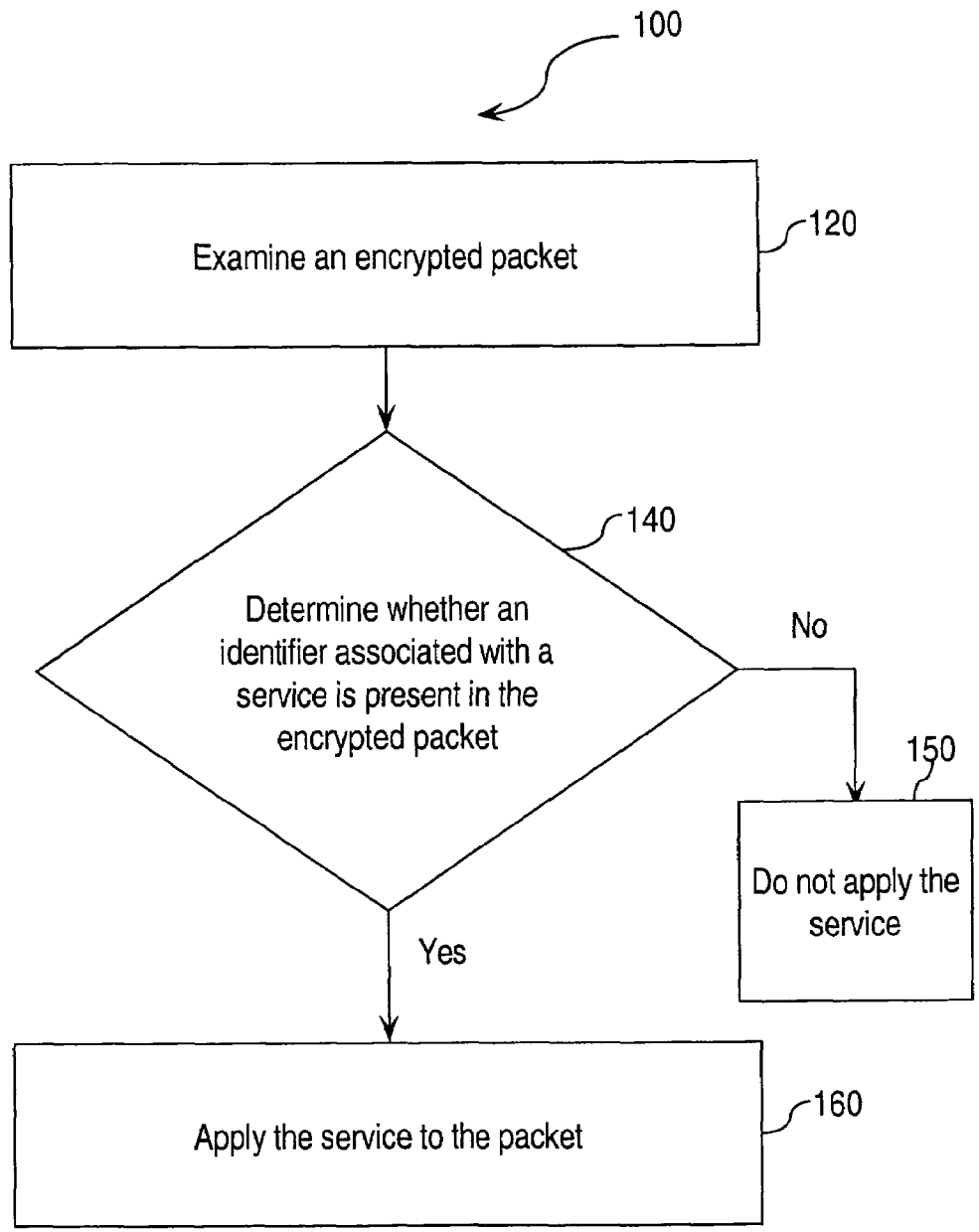
FIG. 1 is a flow chart of an embodiment of a method for applying a service to an encrypted packet.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Approaches for applying service policies to encrypted packets are disclosed. One approach comprises examining an encrypted packet, determining whether an identifier associated with a service is present in an encrypted packet, and if it is determined that the identifier is present in the encrypted packet, applying the service to the encrypted packet. In one embodiment, the identifier is the Internet Key Exchange (IKE) ID of the encrypted packet.

By examining the IKE ID, network components that apply services are able to identify whether encrypted packets are to be subject to services, such as QoS services. Accordingly, the disclosed approaches provide a means to apply services to encrypted packets while at the same time avoiding or reducing the reliance on pre-classification techniques or techniques that copy ToS bits into headers during encryption. The IKE ID is made available to the QoS service in a manner not known before the present disclosure. Additionally, the disclosed approaches provide a means to identify customers, devices and users in the context of VPNs, even if overlapping IP addresses are being used.

In this description, the term "customer" refers broadly to customers of network service providers as well as any other user, machine, enterprise or entity that uses a network. The term "service provider" refers broadly to any entity that provides network services to another, including Internet service providers, managed service providers, large enterprises, and others.

Using the approaches herein, for example, network elements of a service provider can apply QoS to IPsec flows so that the service provider can enforce service guarantees to specific customers and control bandwidth and system resources. In one particular embodiment, by using the IKE Phase 1 ID, it is possible to find a unique attribute to identify a customer consisting of a single user or a group of devices. The IKE ID can be used to identify various classes of users that can have varying QoS policy associated with them. As remote devices establish IKE SAs with the service provider system, the IKE ID information sent by the remote devices is passed to the QoS service on the same system in the form of a tag. Traffic flowing over the outbound IPsec SAs in a class identified by that tag can be aggregated and QoS policy can be applied to the traffic. As a result, a service provider can enforce limitations and ensure certain levels of service to specific customers based on a unique identifier for that customer.

Embodiments are described in sections according to the following outline:
1.0 General Overview
2.0 Approaches for Applying Services to Encrypted Packets
3.0 Implementation Details
   3.1 Adding an Identifier to a Packet Profile
   3.2 Implementation in the Context of Virtual Private Networks
   3.3 Hardware/Software Overview
4.0 Extensions and Alternatives

1.0 GENERAL OVERVIEW

The needs identified in the foregoing Background, and other needs and objects that will become apparent for the following description, are achieved in the present invention, which comprises, in one aspect, approaches for applying service policies to encrypted packets. One approach comprises examining an encrypted packet, determining whether an identifier associated with a service is present in an encrypted packet, and if it is determined that the identifier is present in the encrypted packet, applying the service to the encrypted packet.

In an embodiment of a disclosed approach, the identifier is the IKE ID of the encrypted packet. This IKE ID is received during the initial establishment of a secure control channel (during Aggressive Mode 1 or Main Mode 5). The IKE SA (Security Association) is a control channel used for the establishment and management of IPSEc SAs which transport the actual encrypted traffic. The IKE ID may be protected by encryption upon initial receipt of the IKE packet during initial tunnel establishment, but once it becomes visible an appropriate QoS policy may be applied using that IKE ID. Therefore, the IKE ID may be used by network components that (1) determine whether services are to be applied to a packet, and (2) if services are to be applied to the packet, which services are to be applied to the packet. Various IKE IDs may be mapped to particular services. The network components can read the IKE ID in an encrypted packet, map the IKE ID to a particular service, and then apply the service to the encrypted packet.

In an embodiment, a new field may be added to the Internet Security Association and Key Management Protocol ("ISAKMP") profile of data packets that are transmitted throughout the network. The new field, which may be called a "QoS group ID" or the "ipsec-qos_group" tag is an identifier that maps to particular services to be performed on encrypted packets. The ipsec_qos_group tag, which is set based on the IKE ID value, is stored in an ISAKMP profile (which may contain other attributes such as IKE policy), such that once the IKE ID is determined and an appropriate profile mapping ascertained, the ipsec_qos_group tag can be applied to that particular IKE SA and any IPSec SAs negotiated by that IKE SA. Therefore, similar to the IKE ID, the ipsec_qos_group tag may be used by network components to determine whether service is to be applied to a packet, and, if so, which type of service is to be applied to a packet, both for control (IKE SA) and data (IPsec SA) traffic flows.

The IKE ID and the ipsec-qos_group tag can be used to establish classes that are subject to services in varying granularities. For example, using the possible values of the IKE ID or Phase 1 IDs that are described in RFC 2407 and RFC 2408, classes can be established based on customer name, device name, user or based on other characteristics. Therefore, by using the IKE ID, or an ipsec-qos-group tag based on the IKE ID, to establish classes for services, user specific services, device specific services, and customer specific services may be applied. For example, one could specify an IKE ID class that is subject to a bandwidth guarantee, or which is subject to certain traffic shaping measures.

Additionally, the IKE ID and the IPsec-QoS group tag of packets having overlapping IP addresses may be distinct. For example, even though the packets share an IP address, the packets may have distinct IKE IDs that are based on the user name or customer name. Therefore, because of the presence of the distinct IKE IDs and, in some embodiments, the distinct ipsec_qos_group tag will be maintained throughout processing, it will be possible to define and apply separate services to each packet, even though they share the same IP address. This characteristic is helpful in respect of cases where overlapping IP addresses exist in the context of VPNs, or where the IP addresses found in packets are not the true IP address of the device that initiated a packet transmission, but, rather, the IP address found in the packet is a dummy address added in an IP header during encryption of the packet.

Therefore, using the disclosed approaches, services may be to applied to encrypted packets while avoiding or reducing the reliance on pre-classification techniques or techniques that copy ToS bits into headers during encryption. In some embodiments, it may be advantageous to use the disclosed approaches in combination with approaches that employ pre-classification techniques and/or techniques which copy ToS bits into dummy headers during encryption. Additionally, the disclosed approaches provide a means to identify customers, devices and users in the context of VPNs, even if overlapping IP addresses are being used.

2.0 APPROACHES FOR APPLYING SERVICES TO ENCRYPTED PACKETS

FIG. 1 is a flow chart depicting an embodiment of method 100 for applying a service to an encrypted packet.

Method 100 comprises step 120, which includes examining the encrypted packet. Step 140 includes determining whether an identifier associated with a service is present in the encrypted packet. In an embodiment, the identifier is an IKE ID, or a class tag that is established in an ISAKMP profile of the packet based on an IKE ID. If no identifier is found in the profile, then, as shown in step 150, the service is not applied to the encrypted packet.

If, in step 140, it is determined that an identifier associated with a service is present in the encrypted packet, then, as shown in step 160, the service is applied to the encrypted packet. In this regard, in an embodiment, a class map may be used to map various IKE IDs or other identifiers to the various services, such as bandwidth requirements or shaping requirements, which a device may apply to encrypted packets.

Figure 2:
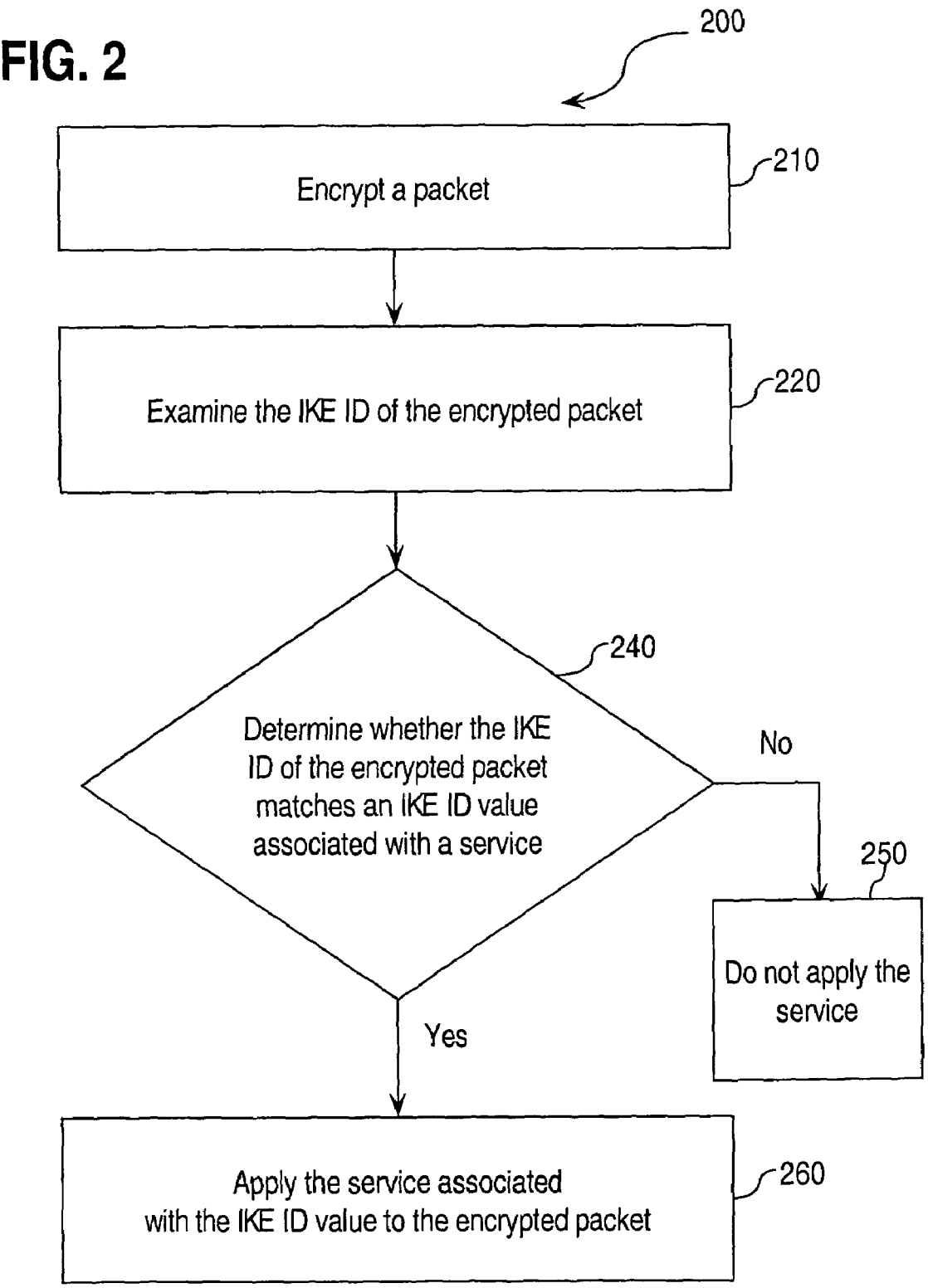
FIG. 2 is a flow chart of an embodiment of a method for applying a service to an encrypted packet.

FIG. 2 is a flow chart depicting an embodiment of method 200 for applying a service to an encrypted packet.

Method 200 is an embodiment of an implementation of method 100, in which an IKE ID is employed as an identifier used in the identification of encrypted packets that require the application of a service. Method 200 includes step 210, in which a packet is encrypted. The packet may be encrypted in accordance with encryption techniques that are used in IPsec or other security protocols.

In step 220, the IKE ID of the encrypted packet may be examined. In other embodiments, any Phase 1 ID may be examined. Additionally, in other embodiments, a group class identifier, ipsec-qos-group tag, which is located in the encrypted packet may be examined. The ipsec_qos_group tag is set upon receipt of the IKE negotiation packet that contains the IKE ID (in Aggressive Mode 1 or Main Mode 5).

Step 240 includes determining whether the IKE ID of the encrypted packet matches an IKE ID value associated with a service. The IKE ID may be various values as described in RFC 2407 and RFC 2408. Such values are discussed below in detail.

In this regard, an implementation of a disclosed approach may include at least one class map in which various IKE ID values or ipseq_qos_group tag values are mapped to various services. A class map may be of various granularities. For example, a class map could specify that packets having an IKE ID that matches an IKE ID associated with a certain service provider customer are subject to a particular service, such as a minimum bandwidth requirement. Or, greater granularity may be specified. For example, a class map could specify that packets containing an IKE ID that is associated with a certain user are to be granted "gold" service (e.g., special service with extra bandwidth).

If, in step 240, it is determined that the IKE ID of the encrypted packet does not match an IKE ID value associated with a service, then, as shown in step 250, no service is applied to the encrypted packet.

As shown in step 260, if, in step 240, it is determined that the IKE ID of the encrypted packet matches an IKE ID value associated with a service, then, the service associated with the IKE ID value is applied to the encrypted packet.

3.0 IMPLEMENTATION DETAILS FOR EXAMPLE EMBODIMENTS

Particular implementation details that can be used in one or more example embodiments are now described. However, other embodiments may use other implementation mechanism.

3.1. Addition of an Identifier to a Packet Profile

In one embodiment, a QoS group ID is added to an ISAKMP profile. Based on the QoS group ID of an encrypted packet, a service is applied to the encrypted packet. The QoS group ID, which, as mentioned above, may be called the ipsec_qos_group tag, may be mapped to the qos_group that is currently used in the definition of class maps for QoS. Then the QoS mechanisms that are in place in the network may make use of this tag to apply services to encrypted IPsec flows.

Additionally, in embodiments, a flag may also be added to the encrypted packet to indicate that the packet includes an ipsec_qos_group field. This flag may be examined during processing to determine whether the ipsec_qos_group should be examined. In an embodiment, if the flag is not present or is not set, traditional techniques of pre-classification and/or techniques that employ the copying of ToS bits may be applied in order to apply services to encrypted packets.

Using class maps or other classification techniques, common groupings of flows may have specific policy classes applied by having the ipsec_qos_group made available to the QoS mechanism before the actual IPsec protection is applied. This allows QoS mechanisms to be applied to classes of traffic that would provide support for such things as restricting the amount of bandwidth available to a class of flows. This is especially helpful to entities like service providers that may want to ensure that their customers get equal access to available bandwidth across links, or which may wish to charge additional amounts to customers that are guaranteed a minimal amount of bandwidth.

A benefit of using an ipsec_qos_group is that QoS can be applied correctly to IPsec packet flows after the IPsec protection has been applied without complicated pre-classification schemes.

As stated above, in an embodiment, the ipsec_qos_group ID is added to the ISAKMP profile of packets, and may be based on the IKE ID. The ISAMP profile is described in RFC 2407 and RFC 2408 and contains a number of IKE IDs (e.g., Phase one IDs).

The IKE ID can be one of several types: ID_KEY_ID (e.g. unity group), FQDN ("fully qualified domain name"), IPV4-ADDRESS, each of which has a specific value that represents the ID of the remote IPsec peer establishing the corresponding IKE SA. The value of the IKE ID can be as granular as a FQDN, which could represent a specific device or user, or it can have a wider scope, such as ID_KEY_ID, which is often used to represent a group of devices/users. Depending on the ID type offered, and the value the receiving device associates with that type, services, such as QoS, can be applied on IPsec flows that are defined on a per user, per customer, or per group basis. When applying the actual policy match criteria, the ID values map to a tag that uniquely identifies the groups of flows so that QoS criteria may be applied.

Therefore, based on this new match criteria (e.g., the ipseq_qos_group tag) that is disclosed in detail above, the ipsec_qos_group tag, the following example shows how all flows identified by customer A can be classed together, and all flows from customer B may be classed together. For example, in an implementation on a network element that runs the Cisco IOS® operating system, the following command-line interface (CLI) commands may be used to establish class maps:

class-map customerA
match qos-group 1
class-map customerB
match qos-group 2

The qos-group tag exists in Cisco CLI. To use this tag in the context of IPsec, according to an embodiment, a new CLI option is added to the ISAKMP profile syntax:

crypto isakmp-profile customerA
match group customerA
set ipsec_qos_group 1

After these instructions are completed the qos-group tag is associated with an IKE phase 1 ID.

As a connection is received, the ID type is extracted from the ID_payload of the Main Mode 5 or AG 1 packets. The ID matches an ISAKMP profile and the ipsec_qos_group tag (if configured) is added to the IKE entry in the IKE Security Association Database ("ISADB"). When IPsec Security Associations ("SA") are created under the protection of the IKE SA, the ipseq_qos_group tag is also added to entries in the Security Association Database ("SADB"). By applying this tag, QoS services have a policy match criteria on which to classify packets without QoS itself requiring new or special knowledge about IKE or IPsec—all QoS sees is the tag value in the packet, with which it is already familiar.

Once the QoS service has the information regarding the ipseq_qos_group tag, it will identify all flows associated with customerA, and aggregate these flows as per the policy associated with this class of service.

The IKE ID that is used to implement foregoing approaches may include one or more of the following identifiers: ID_IPV4_ADDR; ID_FQDN; ID_USER_FQDN; ID_IPV4_ADDR_SUBNET; ID_IPV6_ADDR; ID_IPV6_ADDR_SUBNET; ID_IPV4_ADDR_RANGE; ID_IPV6_ADDR_RANGE; ID_DER_ASN1_DN; ID_DER_ASN1_GN; and ID_KEY_ID.

Detailed descriptions of each of these identifiers may be found in RFC2407. For example, the ID_IPV4_ADDR type specifies a single four (4) octet IPv4 address. A more granular key may be used by employing the ID_FQDN type, which specifies a fully qualified domain name string, such as www-.cisco.com. This ID designates a specific customer.

Or, an even more granular key may be used by employing the IKE ID "ID_USER_FQDN". The ID_USER_FQDN type specifies a fully qualified username string. An example of an ID_USER_FQDN is "piper99@www.cisco.com". This ID designates a specific user.

In certain embodiments, as described above, the IKE ID, rather than a QoS group ID, is simply used. The service policy associated with a particular IKE ID is applied when it is determined that an encrypted packet contains the particular IKE ID. In such embodiments, there is no need to add a QoS group ID field to the ISAKMP profile. However, in some embodiments, it may be efficient to use an ipseq_qos_group tag, because, in some cases, class maps may be customized to use the ipseq_qos_group tag as a match criterion in a manner that is more efficient that using the IKE ID as a match criterion.

3.2. Implementation in the Context of Overlapping IP Addresses

The disclosed approaches provide advantages in context where end devices have overlapping IP addresses. For example, end devices may have overlapping IP addresses in the IPsec context as the "internal" or original source address of the remote device may be an address completely distinct from the IP address used in the IPsec header. Such addresses may be included in dummy headers that are appended to packets during encryption. The dummy header IP addresses do not indicate the source address of the device where the packet originated. Therefore, the IP address may not be used as a basis for determining which services to apply to a packet. Overlapping IP addresses may also occur in VPNs, in which addresses are taken from a pool of IP addresses. Because the IP addresses may be considered to be simply virtual IP addresses that may not indicate the true source of the packet, they cannot be used as a basis for determining which services to apply to a packet.

Figure 3:
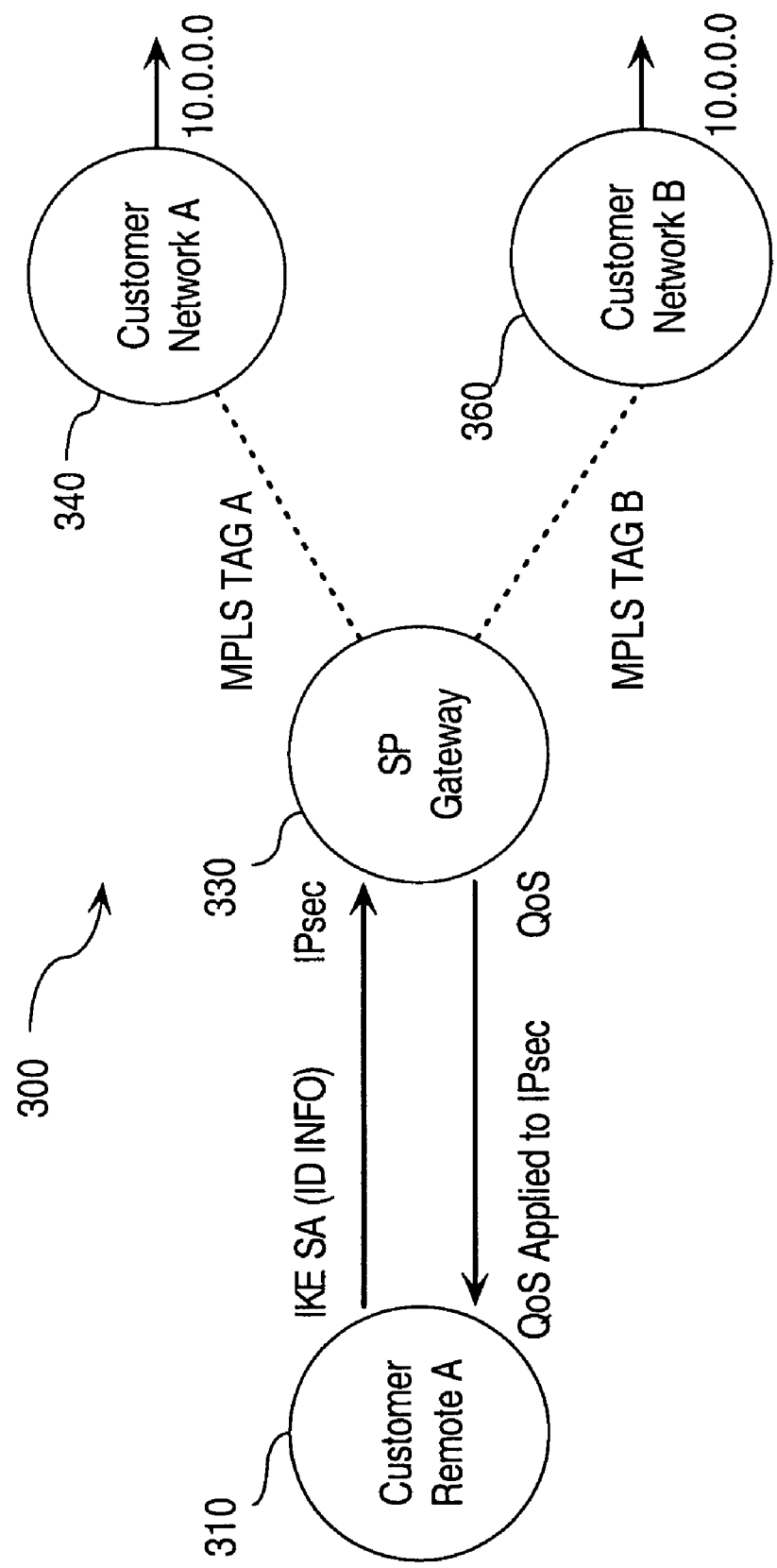
FIG. 3 is a block diagram that illustrates a virtual private network (VPN) upon which an embodiment may be implemented.

FIG. 3 is a block diagram showing an embodiment of a VPN on which an embodiment may be implemented.

In particular, FIG. 3 shows a typical, although simple example of a service provider in a VPN environment using IPsec and MPLS. FIG. 3 shows that remote customer device 310 initiates an IKE SA (whether it is MM or AG). Then, using the disclosed approached, the IKE phase one ID (e.g., the IKE ID or the ipseq_qos_group tag) is learned by Service Provider Gateway 330, its associated label applied as match criteria for QoS classification outbound on the returning interface. FIG. 3 further shows that because MPLS tags are used to route traffic towards the correct customer networks 340 and 360, the fact that non-unique and/or private addresses are used inside those networks is not relevant.

The MPLS tag itself cannot be used as the match criteria on the IPsec side of the network because that tag does not have significance on that outbound interface. The MPLS tag also does not offer the same level of granularity as the ipseq_qos_group tag or IKE ID as these values can be defined on a per-ISAKMP match criteria basis which is really a match on the IKE phase one ID.

An IPsec flow is defined as an SA pair with the main characteristics of a source address, source port, destination address, destination port, and protocol id. These values are those of the original cleartext data that is visible prior to IPsec protection. Other attributes are also used to identify flows and each tuple forms the basis on an entry in the SADB (for example security parameter indexes ("SPI")), although these are not required to define an IPsec flow for QoS application purposes. In one aspect, the disclosed approaches mask the nuances of the IPsec protocol by creating a link to an existing class-map tag that QoS is already familiar with.

In current implementations, when applying QoS to a class of users the following example configuration CLI may be used:

policy-map my_customers
    class-map customerA
    bandwidth 30%
    class-map customerB
    bandwidth 20%
    class-map customers
    bandwidth 15%
    class-map customerD
    bandwidth 10%
    class-map customerA
    match destination-address
    match list 1
    class-map customerB
    match destination-address
    match list 2
    list 1 permit ip 10.1.1.0 any
    list 2 permit ip 10.2.2.0 any In this configuration, each class is a collection of flows with sources from each of the customers networks destined to a remote device. Thus if customer A's subnet is represented by 10.1.1.0, then any packets sourced from the subnet (the QoS is applied on the outbound interface adjacent to the remotes) represent one flow, regardless of where the packets are destined. The destination is important because in many networks, devices are dynamically assigned IP addresses upon boot so it is impossible to pre-provision at the provider end for these dynamic addresses.

As discussed above, one problem in the VPN environment is that customers may use overlapping address spaces within the internal networks. Thus, as shown in FIG. 3, network 10.1.1.0 may not be unique to one particular customer. This phenomenon causes problems with matching as defined the class-maps above. In the example above, there is no unique characteristic that can be used to identify IPsec flows of any one class of user. Additionally, even if uniqueness were possible, IPsec would obscure the original packet header such that it would not be possible to apply QoS in accordance with the original packets contents. It is in this context that the disclosed addition of the IKE ID to the existing pieces of information that can uniquely classify the flows belonging to a particular class of user, may enable service mechanisms, such as QoS, to be successfully applied to an IPsec protected packet.

In other aspects, the invention encompasses a computer apparatus and a computer-readable medium configured to carry out the foregoing steps.

3.3 Hardware/Software Overview

Figure 4:
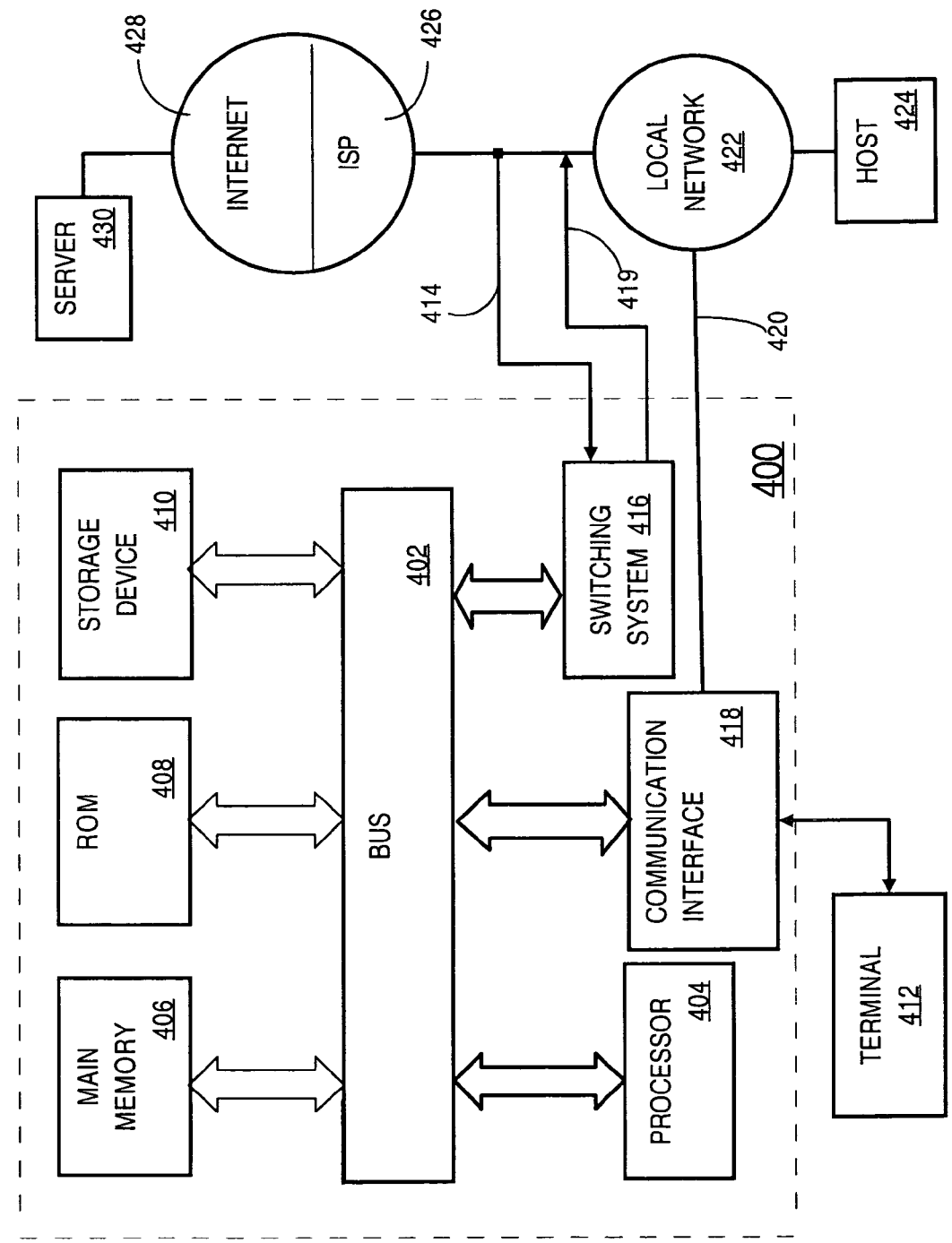
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 to implement the disclosed approaches for applying service policies to encrypted packets. According to one embodiment of the invention, approaches for applying service policies to encrypted packets are provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, and volatile media. Non-volatile media includes, for example, optical or magnetic disks, such as storage device 410. Volatile media includes dynamic memory, such as main memory 406.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides approaches for applying service policies to encrypted packets as described herein.

The received code may be executed by processor 404 as it is received, and/or stored in storage device 410, or other non-volatile storage for later execution. In this manner, computer system 400 may obtain application code in the form of a carrier wave.

4.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for applying a quality of service to an encrypted packet comprising:
    during initial establishment of a secure control channel, receiving and storing an identifier associated with the quality of service in association with a first Internet Key Exchange (IKE) ID;
    examining an encrypted packet;
    without decrypting the encrypted packet, mapping a second IKE ID from the packet, using the first IKE ID, to the identifier associated with the quality of service in a profile portion of the encrypted packet;
    in response to mapping to the identifier associated with the quality of service, applying the associated quality of service to the encrypted packet.

2. The method of claim 1, further comprising the steps of: before the examining:
    encrypting the packet, wherein said step of encryption includes establishing the second IKE ID in the packet.

3. The method of claim 1, wherein the IKE ID comprises one or more of ID_IPV4_ADDR, ID_FQDN, ID_USER_FQDN, ID_IPV4_ADDR_SUBNET, ID_IPV6_ADDR, ID_IPV6_ADDR_SUBNET, ID_IPV4_ADDR_RANGE, ID_IPV6_ADDR_RANGE, ID_DER_ASN1_DN, ID_DER_ASN1_GN, and ID_KEY_ID.

4. The method of claim 1, wherein the identifier associated with the quality of service is based on at least an entry in a security association database.

5. The method of claim 1, wherein said identifier associated with the quality of service maps to a quality of service (QoS) group.

6. The method of claim 2, wherein the first IKE ID is created in a profile of the packet.

7. The method of claim 6, wherein the profile is an ISAKMP profile.

8. The method of claim 2, further comprising a step of pre-classification of the packet prior to the step of encryption.

9. The method of claim 8, wherein the quality of service that is applied is selected based on both the second IKE ID and pre-classification.

10. A method for applying a quality of service to a packet comprising:
    during initial establishment of a secure control channel, receiving and storing an identifier associated with the quality of service in association with a first Internet Key Exchange (IKE) ID;
    encrypting the packet to create an encrypted packet;
    examining an identifier in a profile portion of the encrypted packet, wherein the identifier is based on a second IKE ID of the encrypted packet;
    without decrypting the encrypted packet, mapping the second IKE ID from the packet, using the first IKE ID, to the identifier in the encrypted packet associated with a quality of service to be applied to the encrypted packet; and
    in response to service mapping to the identifier associated with the quality of service, applying the quality of service to the encrypted packet.

11. The method of claim 10, further comprising the step of:
    prior to the step of encrypting, pre-classifying the packet based on the contents of the packet;
    wherein the quality of service that is applied to the packet is selected partially based the step of pre-classification and partially based on the second IKE ID.

12. The method of claim 10, further comprising the step of:
    during encryption, copying at least one bit into a header to identify a characteristic of the packet;
    wherein the quality of service that is applied to the packet is selected partially based on a value of the at least one bit and partially based on the second IKE ID.

13. A computer-readable volatile or non-volatile storage medium comprising one or more sequences of instructions, which when executed by one or more processors, cause the one or more processors to perform applying a quality of service to an encrypted packet by:
    during initial establishment of a secure control channel, receiving and storing an identifier associated with the quality of service in association with a first Internet Key Exchange (IKE) ID;
    examining an encrypted packet;
    without decrypting the encrypted packet, mapping a second IKE ID from the packet, using the first IKE ID, to the identifier associated with the quality of service in a profile portion of the encrypted packet;
    in response to mapping to the identifier associated with the quality of service, applying the associated quality of service to the encrypted packet.

14. The computer-readable medium of claim 13 comprising one or more sequences of instructions, which when executed by one or more processors, cause the one or more processors to carry out before the examining:
    encrypting the packet, wherein said step of encryption includes establishing the second IKE ID in the packet.

15. The computer-readable medium of claim 13 wherein the IKE ID comprises one or more of ID_IPV4_ADDR, ID_FQDN, ID_USER_FQDN, ID_IPV4_ADDR_SUBNET, ID_IPV6_ADDR, ID_IPV6_ADDR_SUBNET, ID_IPV4_ADDR_RANGE, ID_IPV6_ADDR_RANGE, ID_DER_ASN1_DN, ID_DER_ASN1_GN, and ID_KEY_ID.

16. The computer-readable medium of claim 13 wherein the identifier associated with the quality of service is based on at least an entry in a security association database.

17. The computer-readable medium of claim 13 wherein said identifier associated with the quality of service maps to a quality of service (QoS) group.

18. The computer-readable medium of claim 14 wherein the first IKE ID is created in a profile of the packet.

19. The computer-readable medium of claim 18 wherein the profile is an ISAKMP profile.

20. The computer-readable medium of claim 14 further comprising one or more sequences of instructions, which when executed by one or more processors, cause the one or more processors to carry out pre-classification of the packet prior to the encryption.

21. The computer-readable medium of claim 20 wherein the quality of service that is applied is selected based on both the second IKE ID and pre-classification.

22. An apparatus for applying a quality of service to an encrypted packet comprising:
means for receiving and storing an identifier associated with the quality of service in association with a first Internet Key Exchange (IKE) ID during initial establishment of a secure control channel;
means for examining an encrypted packet;
means for mapping, without decrypting the encrypted packet, a second IKE ID from the packet, using the first IKE ID, to the identifier associated with the quality of service in a profile portion of the encrypted packet;
means, responsive to the mapping means, for applying the quality of service to the encrypted packet.

23. The apparatus of claim 22, further comprising means, operable before the examining means, for encrypting the packet, wherein the means for encryption includes means for establishing the second IKE ID in the packet.

24. The apparatus of claim 22, wherein the IKE ID comprises one or more of ID_IPV4_ADDR, ID_FQDN, ID_USER_FQDN, ID_IPV4_ADDR_SUBNET, ID_IPV6_ADDR, ID_IPV6_ADDR_SUBNET, ID_IPV4_ADDR_RANGE, ID_IPV6_ADDR_RANGE, ID_DER_ASN1_DN, ID_DER_ASN1_GN, and ID_KEY_ID.

25. The apparatus of claim 22, wherein the identifier associated with the quality of service is based on at least an entry in a security association database.

26. The apparatus of claim 22, wherein said identifier associated with the quality of service maps to a quality of service (QoS) group.

27. An apparatus for applying a quality of service to an encrypted packet comprising:
one or more processors;
memory communicatively coupled to the one or more processors;
one or more sequences of instructions in the memory for applying a quality of service to an encrypted packet, which instructions, when executed by the one or more processors, cause the one or more processors to perform the steps of:
during initial establishment of a secure control channel, receiving and storing an identifier associated with the quality of service in association with a first Internet Key exchange (IKE) ID;
examining an encrypted packet;
without decrypting the encrypted packet, mapping a second IKE ID from the packet, using the first IKE ID, to the identifier associated with the quality of service in a profile portion of the encrypted packet;
in response to mapping to the identifier associated with the quality of service, applying the quality of service to the encrypted packet.

28. The apparatus of claim 27, further comprising sequences of instructions for performing the steps of:
before the examining:
encrypting the packet, wherein said step of encryption includes establishing said the second IKE ID in the packet.

29. The apparatus of claim 27, wherein the IKE ID comprises one or more of ID_IPV4_ADDR, ID_FQDN, ID_USER_FQDN, ID_IPV4_ADDR_SUBNET, ID_IPV6_ADDR, ID_IPV6_ADDR_SUBNET, ID_IPV4_ADDR_RANGE, ID_IPV6_ADDR_RANGE, ID_DER_ASN1_DN, ID_DER_ASN1_GN, and ID_KEY_ID.

30. The apparatus of claim 27, wherein the identifier associated with the quality of service is based on at least an entry in a security association database.

31. The apparatus of claim 27, wherein said identifier associated with the quality of service maps to a quality of service (QoS) group.

32. The apparatus of claim 28, wherein the first IKE ID is created in a profile of the packet.

33. The apparatus of claim 32, wherein the profile is an ISAKMP profile.

34. The apparatus of claim 28, further comprising a step of pre-classification of the packet prior to the step of encryption.

35. The apparatus of claim 34, wherein the quality of service that is applied is selected based on both the second IKE ID and pre-classification.

36. The apparatus of claim 23, wherein the first IKE ID is created in a profile of the packet.

37. The apparatus of claim 32, wherein the profile is an ISAKMP profile.

38. The apparatus of claim 23, further comprising means for pre-classification of the packet prior to the step of encryption.

39. The apparatus of claim 34, comprising means for selecting the quality of service that is applied based on both the second IKE ID and pre-classification.

* * * * *